US012040116B2

(12) United States Patent
Kunitsuka et al.

(10) Patent No.: US 12,040,116 B2
(45) Date of Patent: Jul. 16, 2024

(54) COMMON MODE FILTER

(71) Applicant: TDK Corporation, Tokyo (JP)

(72) Inventors: Kosuke Kunitsuka, Tokyo (JP); Keigo Higashida, Tokyo (JP); Emi Ito, Yamagata (JP)

(73) Assignee: TDK CORPORATION, Tokyo (JP)

( * ) Notice: Subject to any disclaimer, the term of this patent is extended or adjusted under 35 U.S.C. 154(b) by 630 days.

(21) Appl. No.: 17/342,051

(22) Filed: Jun. 8, 2021

(65) Prior Publication Data

US 2021/0391108 A1 Dec. 16, 2021

(30) Foreign Application Priority Data

Jun. 16, 2020 (JP) ................................ 2020-103913

(51) Int. Cl.

| | |
|---|---|
| ***H01F 17/04*** | (2006.01) |
| ***H01F 17/00*** | (2006.01) |
| ***H01F 27/28*** | (2006.01) |
| ***H01F 27/29*** | (2006.01) |
| ***H01F 27/30*** | (2006.01) |

(52) U.S. Cl.
CPC ....... *H01F 17/045* (2013.01); *H01F 27/2828* (2013.01); *H01F 27/292* (2013.01); *H01F 27/306* (2013.01); *H01F 2017/0093* (2013.01)

(58) Field of Classification Search
CPC .. H01F 17/045; H01F 27/2828; H01F 27/292; H01F 27/306; H01F 2017/0093
See application file for complete search history.

(56) References Cited

U.S. PATENT DOCUMENTS

| | | | | |
|---|---|---|---|---|
| 2014/0097928 | A1* | 4/2014 | Tomonari | H01F 17/045 336/207 |
| 2014/0167903 | A1* | 6/2014 | Tomonari | H01F 17/045 336/220 |
| 2017/0069418 | A1* | 3/2017 | Yamakita | H01F 27/29 |
| 2017/0169935 | A1* | 6/2017 | Miyamoto | H01F 19/04 |
| 2017/0294264 | A1* | 10/2017 | Hashimoto | H01F 17/045 |
| 2017/0301455 | A1* | 10/2017 | Kobayashi | H01F 27/2823 |
| 2018/0211764 | A1* | 7/2018 | Komaya | H01F 17/04 |
| 2019/0228901 | A1* | 7/2019 | Asai | H01F 27/006 |
| 2020/0005981 | A1* | 1/2020 | Takezawa | H01F 27/2823 |

FOREIGN PATENT DOCUMENTS

| | | | |
|---|---|---|---|
| JP | 2011253888 | A * | 12/2011 |
| JP | 2019-121791 | A | 7/2019 |

* cited by examiner

*Primary Examiner* — Malcolm Barnes
(74) *Attorney, Agent, or Firm* — Rimon P.C.

(57) ABSTRACT

Disclosed herein is a common mode filter that includes a core having a winding core part and first and second wires wound in a same direction around the winding core part. The first and second wires have a first crossing portion at which first turns thereof counted from one ends thereof cross each other and a second crossing portion at which first turns thereof counted from the other ends thereof cross each other. The first and second wires are wound by layer winding in an aligned state with one of the first and second wires positioned in a lower layer and other one thereof positioned in an upper layer in at least parts of the first and second wires between second turns thereof counted from the one ends thereof and second turns thereof counted from the other ends thereof.

17 Claims, 9 Drawing Sheets

COMMON MODE FILTER

BACKGROUND OF THE INVENTION

Field of the Invention

The present invention relates to a common mode filter and, more particularly, to a common mode filter of a type in which a pair of wires cross each other along the way and a manufacturing method therefor.

Description of Related Art

A common mode filter is widely used in many electronic devices, such as mobile electronic devices and on-vehicle LANs, as an element for removing common mode noise superimposed on differential signal lines. In recent years, a common mode filter using a surface-mountable drum core supersedes a common mode filter using a toroidal core (see JP 2019-121791A).

In a common mode filter described in JP 2019-121791A, a pair of wires are made to cross each other an even number of times along the way to enhance the symmetry of differential signals in high frequency regions. In recent years, it has been demanded to sufficiently reduce mode conversion characteristics indicating a rate at which a differential signal component is converted into a common mode noise component in high frequency regions. One of the major factors that degrade the mode conversion characteristics is a disturbance in the symmetry of a pair of wires. Thus, by enhancing the symmetry of a pair of wires as in the common mode filter described in JP 2019-121791A, the mode conversion characteristics in high frequency regions can be improved.

Studies conducted by the present inventors reveal that the degradation in the mode conversion characteristics due to disturbance of a pair of wire is more conspicuous in turns closer to the input side of differential signals. Thus, in the configuration of the common mode filter described in JP 2019-121791A, in which a pair of wires are made to cross each other after winding of several turns from the wire end portion, it is difficult to sufficiently improve the mode conversion characteristics in high frequency regions.

SUMMARY

It is therefore an object of the present invention to sufficiently improve the mode conversion characteristics in high frequency regions in a common mode filter in which a pair of wires cross each other along the way.

A common mode filter according to the present invention includes: a core having a winding core part, a first flange part provided at one axial end of the winding core part, and a second flange part provided at the other axial end of the winding core part; first and second wires wound in the same direction around the winding core part; first and second terminal electrodes provided on the first flange part and connected respectively with one ends of the first and second wires; and third and fourth terminal electrodes provided on the second flange part and connected respectively with the other ends of the first and second wires . The first and second wires have a first crossing portion at which the first turns thereof counted from the one ends cross each other and a second crossing portion at which the first turns thereof counted from the other ends cross each other and are wound by layer winding in an aligned state with one of the first and second wires positioned in the lower layer and the other one thereof positioned in the upper layer in at least parts of the first and second wires between the second turns thereof counted from the one ends and second turns thereof counted from the other ends.

According to the present invention, the first turns of the pair of wires cross each other, so that mode conversion characteristics in high frequency regions can be improved. In addition, the pair of wires cross each other at both end portions thereof, so that bidirectional mode conversion characteristics can be improved in a configuration in which differential signals are bidirectionally transmitted.

In the present invention, the first flange part may have a first surface covered with connection portions of the first and second terminal electrodes at which one ends of the first and second wires are respectively connected, and the second flange part may have a second surface covered with connection portions of the third and fourth terminal electrodes at which the other ends of the first and second wires are respectively connected, the winding core part may have a winding surface parallel to the first and second surfaces, and first and second crossing portions may be both positioned on the winding surface. With this configuration, the wire length from the first and second terminal electrodes to the first crossing portion and the wire length from the third and fourth terminal electrodes to the second crossing portion are substantially equal to each other, making it possible to reduce the difference in the mode conversion characteristics due to the difference in input direction of differential signals.

In the present invention, the first and second wires may have a first layer winding portion in which the first and second wires are wound by layer winding in an aligned state with one of the first and second wires positioned in the lower layer and the other one thereof positioned in the upper layer, a second layer winding portion in which the first and second wires are wound by layer winding in an aligned state with the one of the first and second wires positioned in the upper layer and the other one thereof positioned in the lower layer, and a third crossing portion positioned between the first and second layer winding portions, at which the first and second wires cross each other. This can further enhance the symmetry between the first and second wires . In this case, to further enhance the symmetry between the first and second wires, the difference in the number of turns between the first and second layer winding portions is preferably one or less.

In the present invention, the first and second wires may further have a third layer winding portion in which the first and second wires are wound by layer winding in an aligned state with one of the first and second wires positioned in the lower layer and the other one thereof positioned in the upper layer and a fourth crossing portion positioned between the second and third layer winding portions, at which the first and second wires cross each other. This can further enhance the symmetry between the first and second wires and can reduce a parasitic capacitance component. In this case, to further enhance the symmetry between the first and second wires, the number of turns of the first layer winding portion and the number of turns of the third layer winding portion should preferably be the same.

Thus, according to the present invention, the mode conversion characteristics in high frequency regions can be improved in a common mode filter in which a pair of wires cross each other along the way.

BRIEF DESCRIPTION OF THE DRAWINGS

The above features and advantages of the present invention will be more apparent from the following description of certain preferred embodiments taken in conjunction with the accompanying drawings, in which.

BRIEF DESCRIPTION OF THE DRAWINGS

Hereinafter, a preferred embodiment of the present invention will be described in detail with reference to the accompanying drawings.

Figure 1:
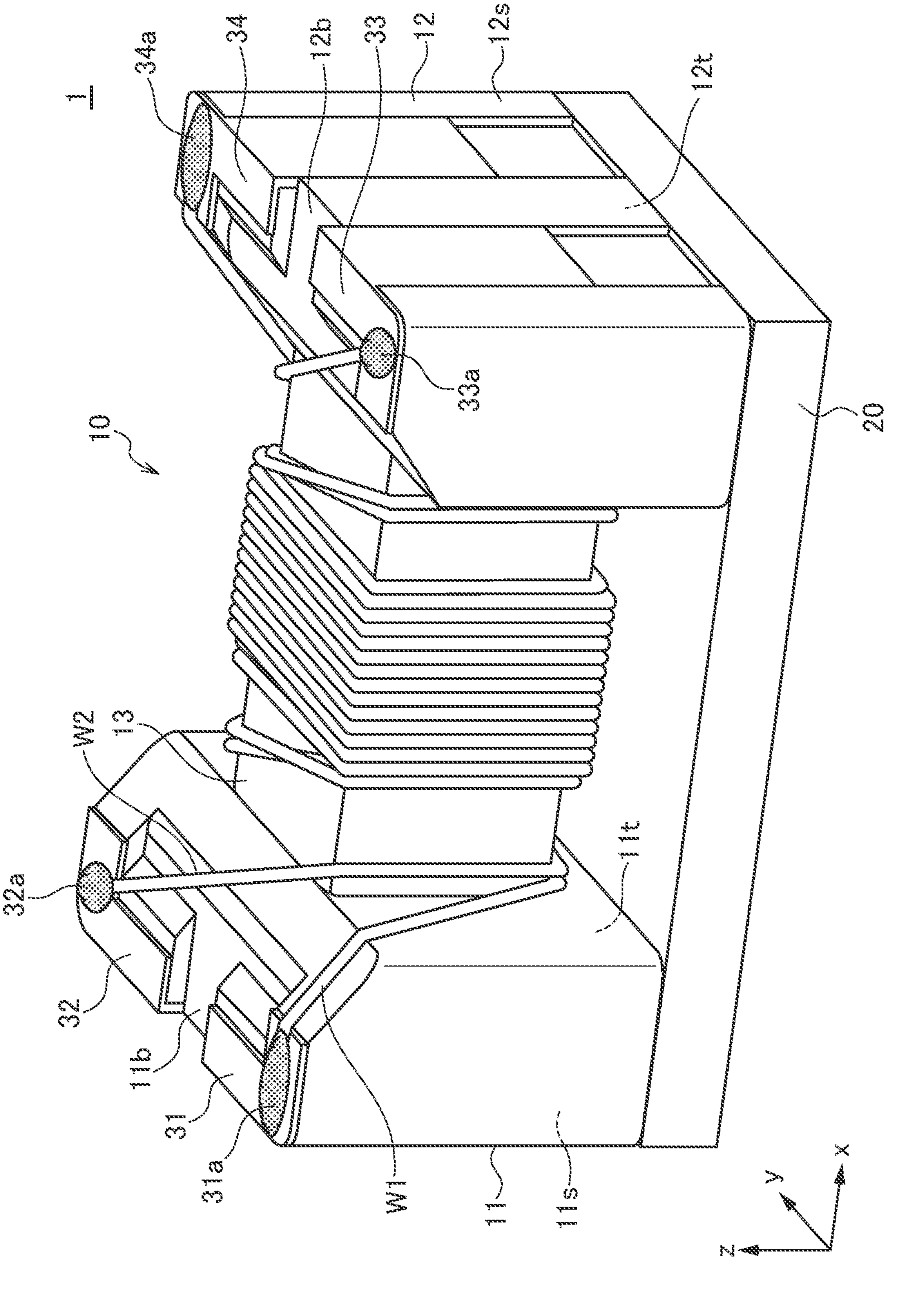
FIG. 1 is a schematic perspective view illustrating the outer appearance of a common mode filter 1 according to a first embodiment of the present invention.

FIG. 1 is a schematic perspective view illustrating the outer appearance of a common mode filter 1 according to a first embodiment of the present invention.

As illustrated in FIG. 1, the common mode filter 1 according to the first embodiment includes a drum core 10, a plate core 20, first to fourth terminal electrodes 31 to 34, and first and second wires W1 and W2. The drum core 10 and plate core 20 are each made of a magnetic material such as an Ni—Zn based ferrite. The first to fourth terminal electrodes 31 to 34 are each a metal fitting made of a good conductor material such as copper. The first to fourth terminal electrodes 31 to 34 may be obtained by directly baking silver paste or the like onto the drum core 10.

The drum core 10 has a first flange part 11, a second flange part 12, and a winding core part 13 disposed between the first and second flange parts 11 and 12. The winding core part 13 has its axis direction in the x-direction. The first and second flange parts 11 and 12 are disposed at axial both ends of the winding core part 13 and integrally formed with the winding core part 13. The plate core 20 is bonded to upper surfaces 11*t* and 12*t* of the respective flange parts 11 and 12. The upper surfaces 11*t* and 12*t* of the respective flange parts 11 and 12 constitute the xy plane, and their opposite surfaces are used as mounting surfaces 11*b* and 12*b*. The first and second terminal electrodes 31 and 32 are each provided on the mounting surface 11*b* of the first flange part 11 and an outer surface 11*s* thereof, and the third and fourth terminal electrodes 33 and 34 are each provided on the mounting surface 12*b* of the second flange part 12 and an outer surface 12*s* thereof. The outer surfaces 11*s* and 12*s* each constitute the yz plane. Fixation of the first to fourth terminals 31 to 34 is made by using an adhesive or the like.

The first and second wires W1 and W2 are wound around the winding core part 13 in the same direction. One and the other ends of the first wire W1 are connected respectively to connection portions 31*a* and 33*a* of the first and third terminal electrodes 31 and 33, and one and the other ends of the second wire W2 are connected respectively to connection portions 32*a* and 34*a* of the second and fourth terminal electrodes 32 and 34. The number of turns of the first wire W1 and the number of turns of the second wires W2 are the same. The connection portions 31*a* and 32*a* of the first and second terminal electrodes 31 and 32 are positioned on the mounting surface 11*b*, and connection portions 33*a* and 34*a* of the third and fourth terminal electrodes 33 and 34 are positioned on the mounting surface 12*b*.

Figure 2:
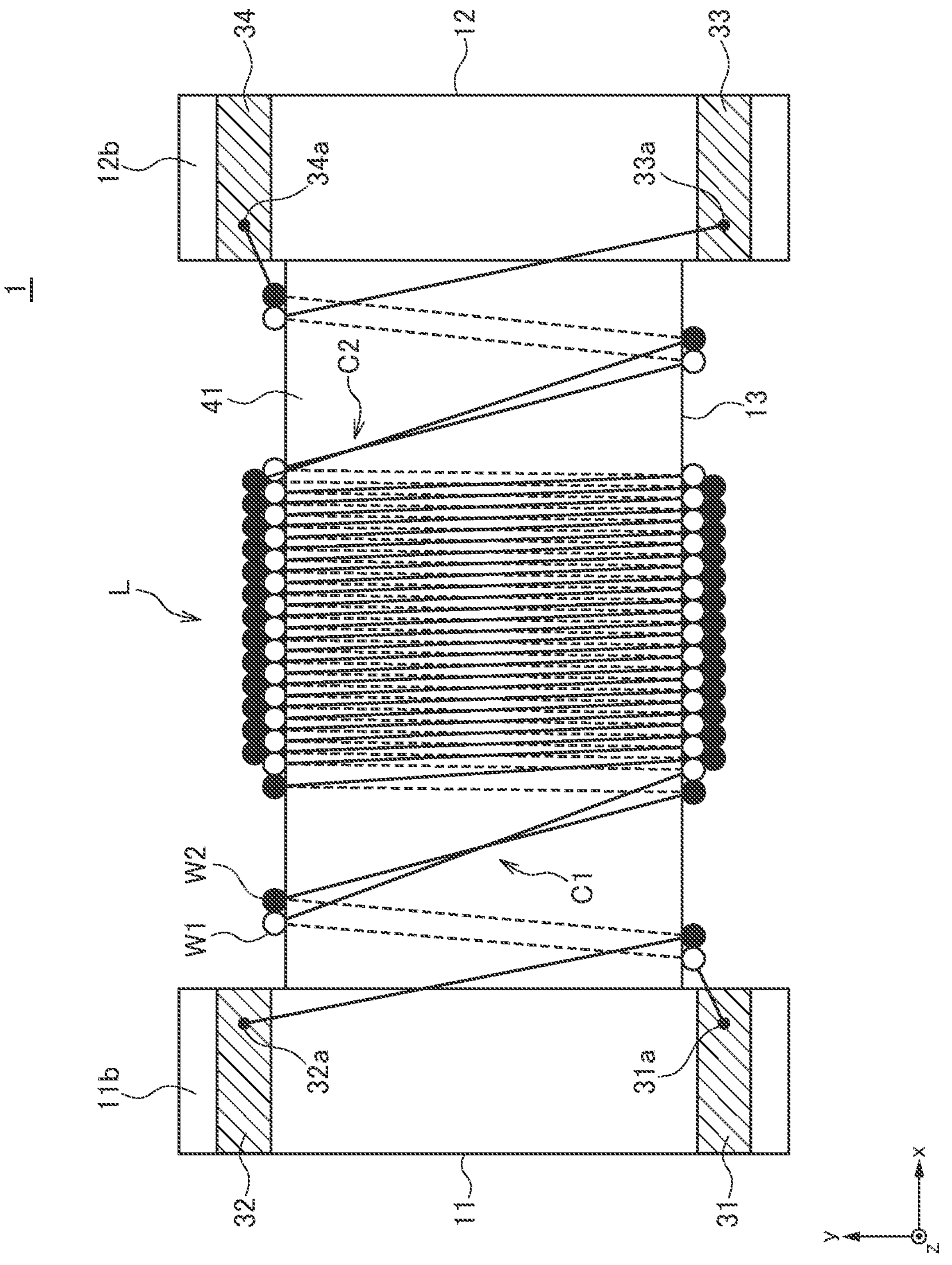
FIG. 2 is a schematic plan view for explaining the winding layout of the first and second wires W1 and W2 in a common mode filter 1.
Figure 3:
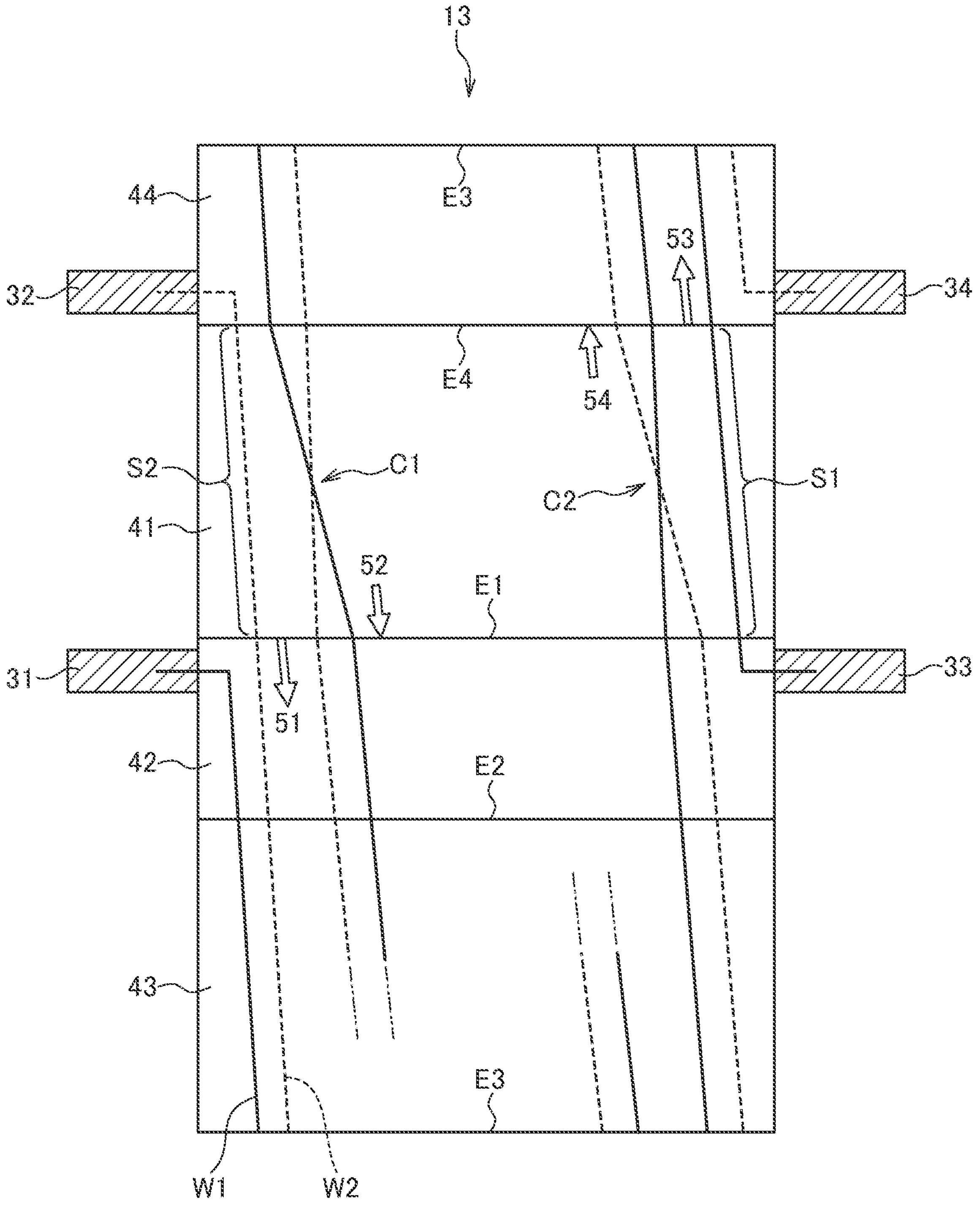
FIG. 3 is a schematic developed view for explaining the winding layout of the first and second wires W1 and W2 in a common mode filter 1.

FIG. 2 is a schematic plan view for explaining the winding layout of the first and second wires W1 and W2. FIG. 3 is a schematic developed view for explaining the winding layout of the first and second wires W1 and W2.

In the present embodiment, the winding core part 13 has a substantially rectangular shape in yz cross section and has four winding surfaces 41 to 44 as illustrated in FIG. 3. The winding surfaces 41 and 43 constitute the xy plane, and the winding surfaces 42 and 44 constitute the xz plane. The boundary between the winding surfaces 41 and 42 is defined by an edge E1, the boundary between the winding surfaces 42 and 43 is defined by an edge E2, boundary between the winding surfaces 43 and 44 is defined by an edge E3, and the boundary between the winding surfaces 44 and 41 is defined by an edge E4.

As illustrated in FIGS. 2 and 3, the first and second wires W1 and W2 have a first crossing portion C1 at which the first turns thereof counted respectively from the connection portions 31*a* and 32*a* cross each other and a second crossing portion C2 at which the first turns thereof counted respectively from the connection portions 33*a* and 34*a* cross each other. The positional relationship between the first and second wires W1 and W2 is reversed before and after the crossing.

The first turns of the first and second wires W1 and W2 counted from one ends thereof are each defined by a section starting at the edge E1 (denoted by the arrow 51) and ending at the edge E1 (denoted by the arrow 52). The same applies to the second and subsequent turns. This is because the terminal electrodes 31 and 32 are disposed offset in the negative y-direction and in the positive y-direction, respectively, as viewed from the center axis of the winding core part 13, so that the first wire W1 paired with the second wire W2 does not exist in a section S2 of the second wire W2 positioned on the winding surface 41. Similarly, the first turns of the first and second wires W1 and W2 counted from the other ends thereof are each defined by a section starting at the edge E4 (denoted by the arrow 53) and ending at the edge E4 (denoted by the arrow 54). The same applies to the second and subsequent turns. This is because the terminal electrodes 33 and 34 are disposed offset in the negative y-direction and in the positive y-direction, respectively, as viewed from the center axis of the winding core part 13, so that the first wire W2 paired with the first wire W1 does not exist in a section S1 of the first wire W1 positioned on the winding surface 41.

Further, parts of the first and second wires W1 and W2 between the second turns thereof counted from one ends and the second turns thereof counted from the other ends constitute a layer winding portion L. In the layer winding portion L, the first and second wires W1 and W2 are wound by layer winding in an aligned state with the first wire W1 positioned in the lower layer and the second wire W2 positioned in the upper layer. Thus, even when the numbers of turns of the first and second wires W1 and W2 are large, the length of the winding core part 13 in the x-direction can be reduced. Although the number of turns in the layer winding portion L is 14 in the example of FIG. 2, it is not particularly limited. To achieve the layer winding of the first and second wires W1 and W2 in an aligned state, the wire in the upper layer needs to be wound along the valley line formed by adjacent turns of the wire in the lower layer, so that the number of turns of the wire in the upper layer is smaller by one than the number of turns of the wire in the lower layer. Thus, the second turn of the second wire W2 counted from the connection portion 32*a* is exceptionally positioned in the lower layer.

As described above, in the common mode filter 1 according to the present embodiment, the first turns of the first and second wires W1 and W2 counted from one ends thereof connected respectively to the terminal electrodes 31 and 32 cross each other, and the first turns of the first and second wires W1 and W2 counted from the other ends thereof connected respectively to the terminal electrodes 33 and 34 cross each other. When the first and second wires W1 and W2 are made to cross each other, symmetry therebetween before and after the crossing is enhanced to improve the mode conversion characteristics. As described above, deterioration in the mode conversion characteristics due to disturbance of the symmetry is more conspicuous in turns closer to the input side of differential signals; however, in the common mode filter 1 according to the present embodiment, the first turns of the first and second wires W1 and W2 cross each other, so that the mode conversion characteristics in high frequency regions are significantly improved. In addition, the crossing portions C1 and C2 are positioned at both end portions of the first and second wires W1 and W2, so that it is possible to provide a common mode filter having no directivity and to improve the signal quality of bidirectional differential signals.

Further, the crossing portions C1 and C2 are both positioned on the winding surface 41. Thus, the length of the first wire W1 positioned between the first terminal electrode 31 and the first crossing portion C1 and the length of the second wire W2 positioned between the fourth terminal electrode 34 and the second crossing portion C2 are substantially coincide with each other, and the length of the second wire W2 positioned between the second terminal electrode 32 and the first crossing portion C1 and the length of the first wire W1 positioned between the third terminal electrode 33 and the second crossing portion C2 substantially coincide with each other. As a result, there is little difference between the mode conversion characteristics when the first and second terminal electrodes 31 and 32 are set as an input side and the mode conversion characteristics when the third and fourth terminal electrodes 33 and 34 are set as an input side.

Figure 4:
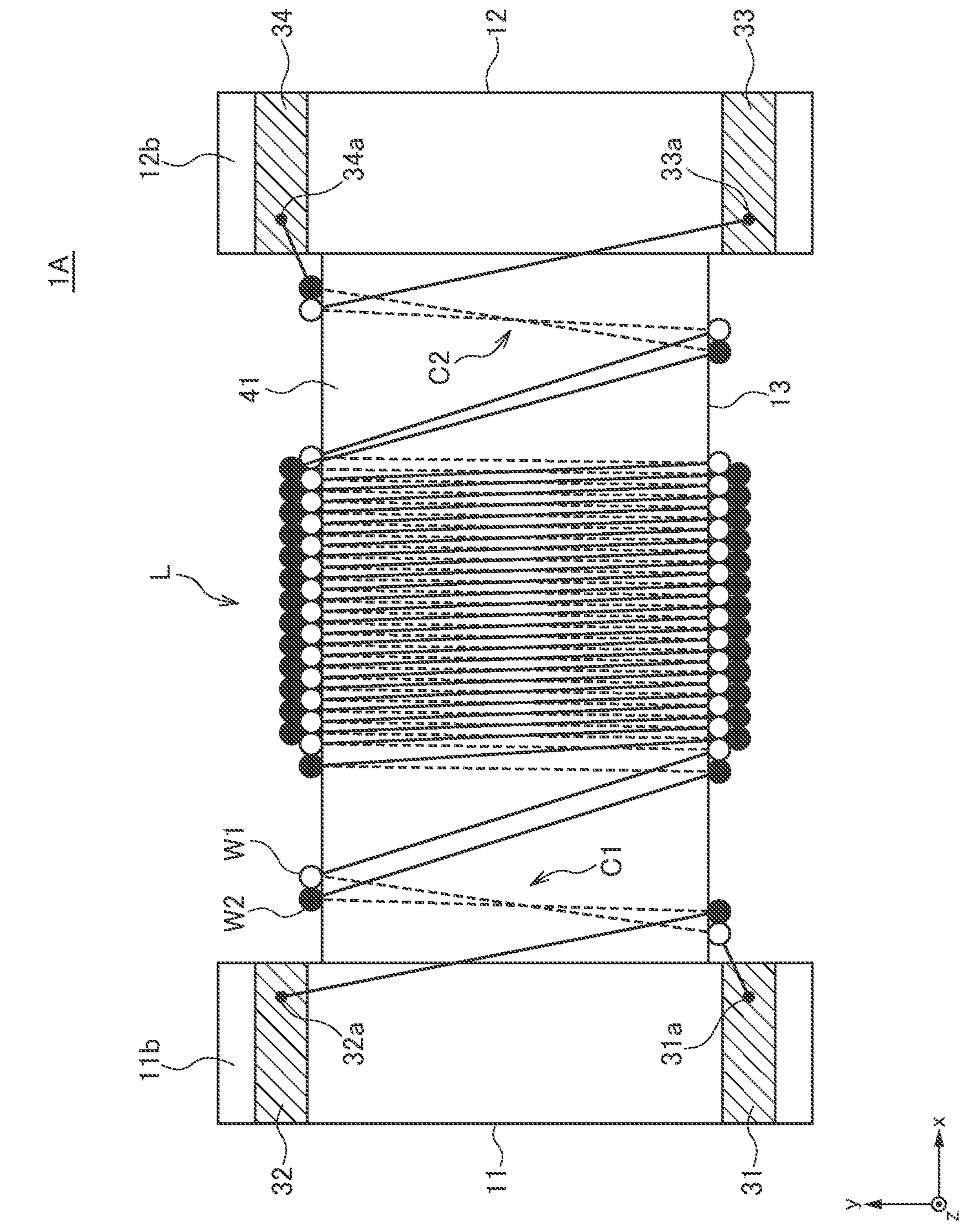
FIG. 4 is a schematic plan view for explaining the winding layout of the first and second wires W1 and W2 in a common mode filter 1A according to a first modification.
Figure 5:
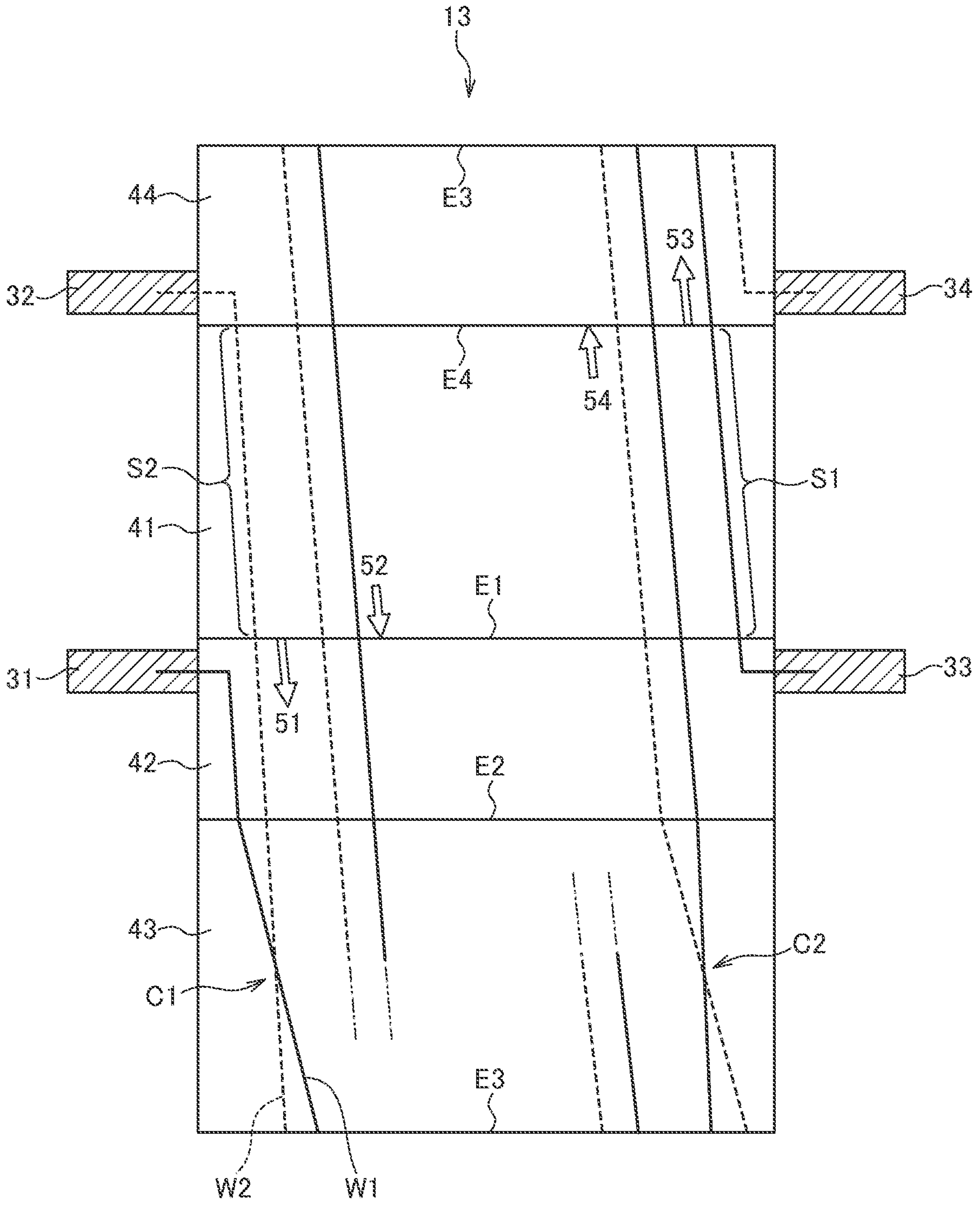
FIG. 5 is a schematic developed view for explaining the winding layout of the first and second wires W1 and W2 in the common mode filter 1A according to the first modification.

FIG. 4 is a schematic plan view for explaining the winding layout of the first and second wires W1 and W2 in a common mode filter 1A according to a first modification. FIG. 5 is a schematic developed view for explaining the winding layout of the first and second wires W1 and W2 in the common mode filter 1A according to the first modification.

As illustrated in FIGS. 4 and 5, the common mode filter 1A according to the first modification differs from the common mode filter 1 according to the first embodiment in that the first and second crossing portions C1 and C2 are both positioned on the winding surface 43. Other basic configurations are the same as those of the common mode filter 1 according to the first embodiment, so the same reference numerals are given to the same elements, and overlapping description will be omitted. In the common mode filter 1A according to the first modification, the first and second wires W1 and W2 cross each other at an earlier stage as viewed from the terminal electrodes 31 to 34, allowing the mode conversion characteristics to be further improved.

Figure 6:
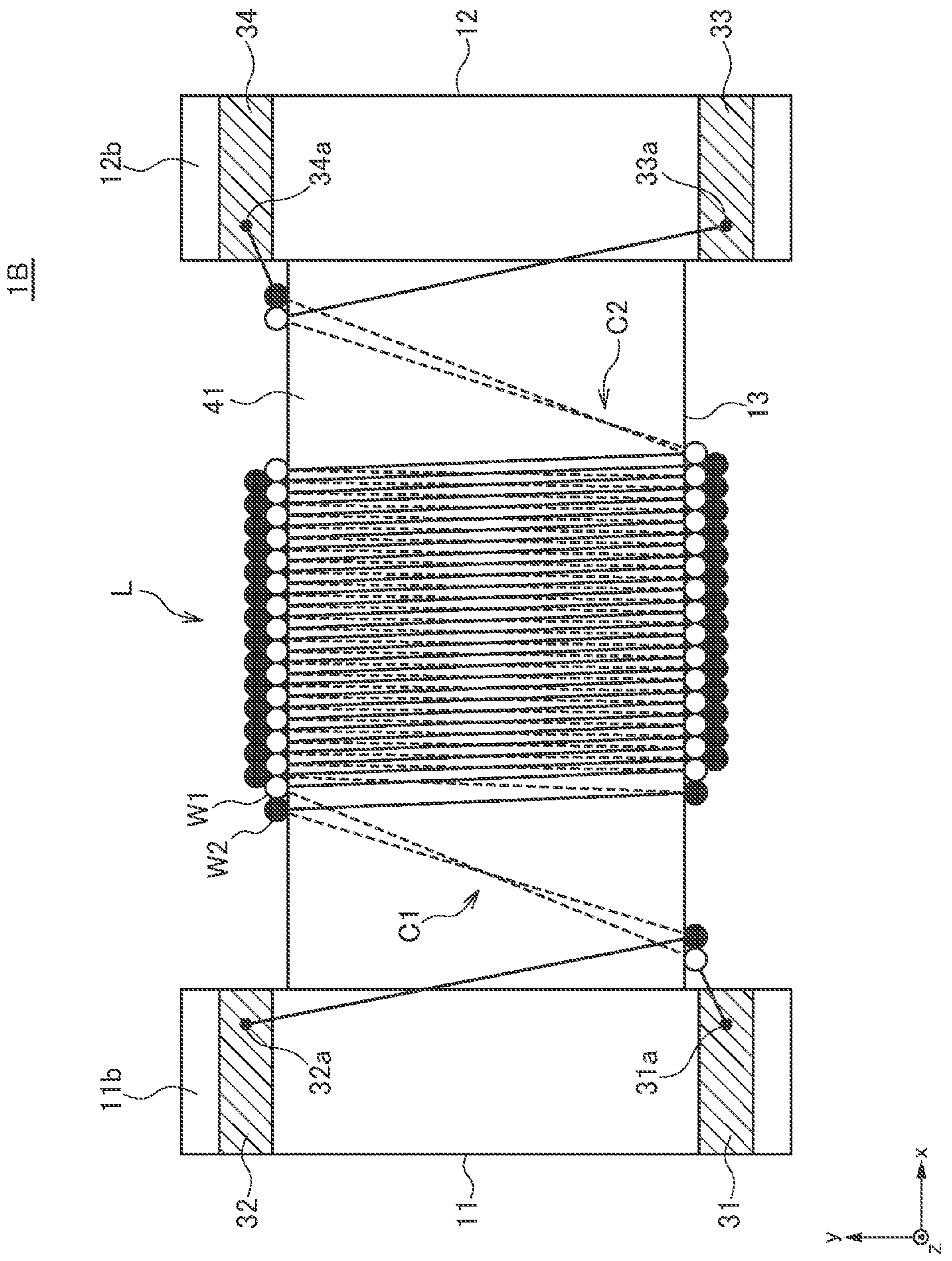
FIG. 6 is a schematic plan view for explaining more in detail the winding layout of the first and second wires W1 and W2 in a common mode filter 1B according to a second modification.

FIG. 6 is a schematic plan view for explaining more in detail the winding layout of the first and second wires W1 and W2 in a common mode filter 1B according to a second modification.

As illustrated in FIG. 6, in the common mode filter 1B according to the second embodiment, the first turns of the first and second wires W1 and W2 counted from one ends and those counted from the other ends partially belong to the layer winding portion L. Other basic configurations are the same as those of the common mode filter 1A according to the first modification, so the same reference numerals are given to the same elements, and overlapping description will be omitted. As exemplified by the common mode filter 1B according to the second modification, the first turns of the first and second wires W1 and W2 may be partially included in the layer winding portion L.

Figure 7:
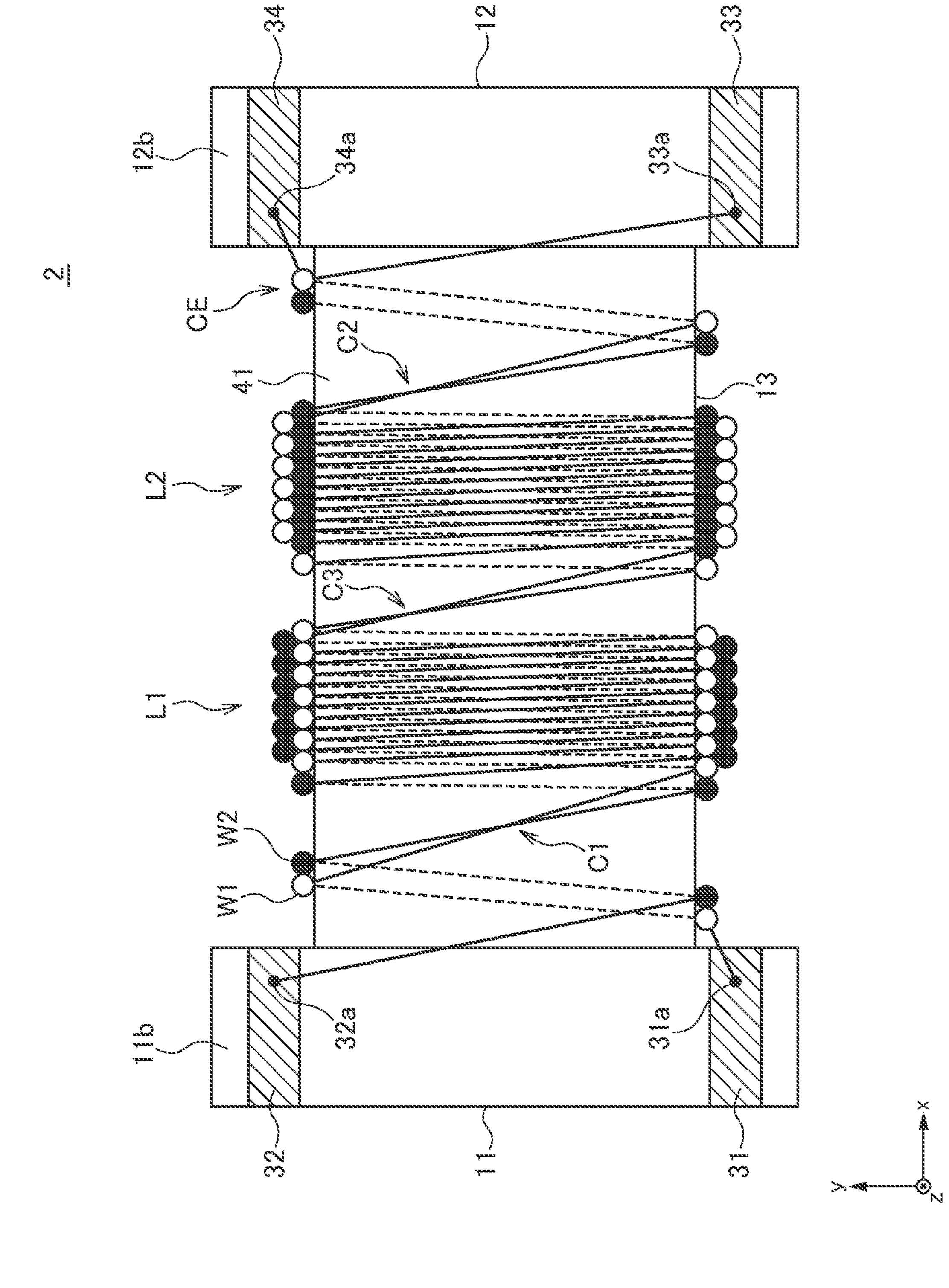
FIG. 7 is a schematic plan view for explaining the winding layout of the first and second wires W1 and W2 in a common mode filter 2 according to a second embodiment of the present invention.

FIG. 7 is a schematic plan view for explaining the winding layout of the first and second wires W1 and W2 in a common mode filter 2 according to a second embodiment.

As illustrated in FIG. 7, the common mode filter 2 according to the second embodiment differs from the common mode filter 1 according to the first embodiment in that the layer winding portion L is divided into a first layer winding portion L1 and a second layer winding portion L2 and that a third crossing portion C3 is provided between the first and second layer winding portions L1 and L2. Other basic configurations are the same as those of the common mode filter 1 according to the first embodiment, so the same reference numerals are given to the same elements, and overlapping description will be omitted.

The first and second wires W1 and W2 are wound by layer winding in an aligned state, where in the first layer winding portion L1, the first wire W1 is positioned in the lower layer and the second wire W2 is positioned in the upper layer, whereas in the second layer winding portion L2, the second wire W2 is positioned in the lower layer and the first wire W1 is positioned in the upper layer. Although the number of turns in each of the layer winding portions L1 and L2 is seven in the example of FIG. 7, it is not particularly limited. In the first layer winding portion L1, the second turn of the second wire W2 counted from the connection portion 32*a* is exceptionally positioned in the lower layer, and in the second layer winding portion L2, the ninth turn of the first wire W1 counted from the connection portion 31*a* is exceptionally positioned in the lower layer.

As described above, the common mode filter 2 according to the second embodiment has the two layer winding portions L1 and L2, wherein the vertical positions of the first and second wires W1 and W2 are reversed between the layer winding portions L1 and L2, allowing the lengths of the first and second wires W1 and W2 to substantially coincide with each other. In addition, the first and second wires W1 and W2 cross each other between the first and second layer winding portions L1 and L2, allowing the symmetry between the first and second wires W1 and W2 to be further enhanced.

Figure 8:
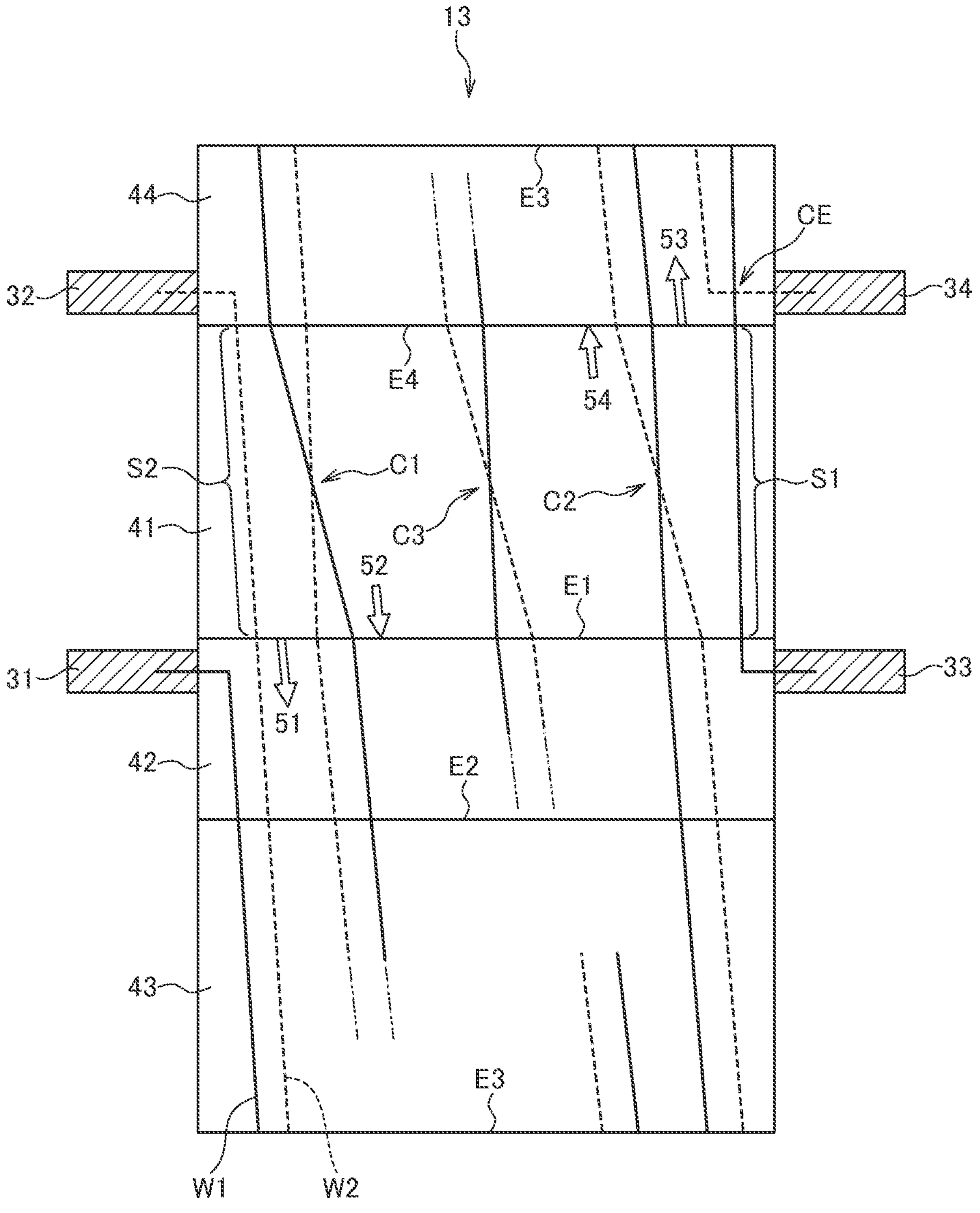
FIG. 8 is a schematic developed view for explaining the winding layout of the first and second wires W1 and W2 in the common mode filter 2 according to the second embodiment.

FIG. 8 is a schematic developed view for explaining the winding layout of the first and second wires W1 and W2 in the common mode filter 2 according to the second embodiment.

As illustrated in FIG. 8, in the common mode filter 2 according to the second embodiment, the first to third crossing portions C1 to C3 are all positioned on the winding surface 41. If the first and second wires w1 and W2 are made to cross each other an odd number of times, the positional relationship between the first and second wires W1 and W2 at one end side and the positional relationship therebetween at the other end side are disadvantageously reversed. However, in the common mode filter 2 according to the present embodiment, the first turns of the first and second wires W1 and W2 counted from the other ends are made to cross each other at a crossing portion CE on the winding surface 44, so that the positional relationship between the first and second wires W1 and W2 at one end side and the positional relationship therebetween at the other end side coincide with each other.

As described above, in the common mode filter 2 according to the second embodiment, the symmetry between the first and second wires W1 and W2 is further enhanced, allowing the mode conversion characteristics to be further improved. When the total number of turns in the first and second layer winding portions L1 and L2 is even, half of the total number of turns is preferably assigned to each of the first and second layer winding portions L1 and L2 to make the numbers of turns in the first and second layer winding portions L1 and L2 coincide with each other. On the other hand, when the total number of turns in the first and second layer winding portions L1 and L2 is odd, the difference in the number of turns between the first and second layer winding portions L1 and L2 is preferably set to one to minimize the difference in the number of turns.

Figure 9:
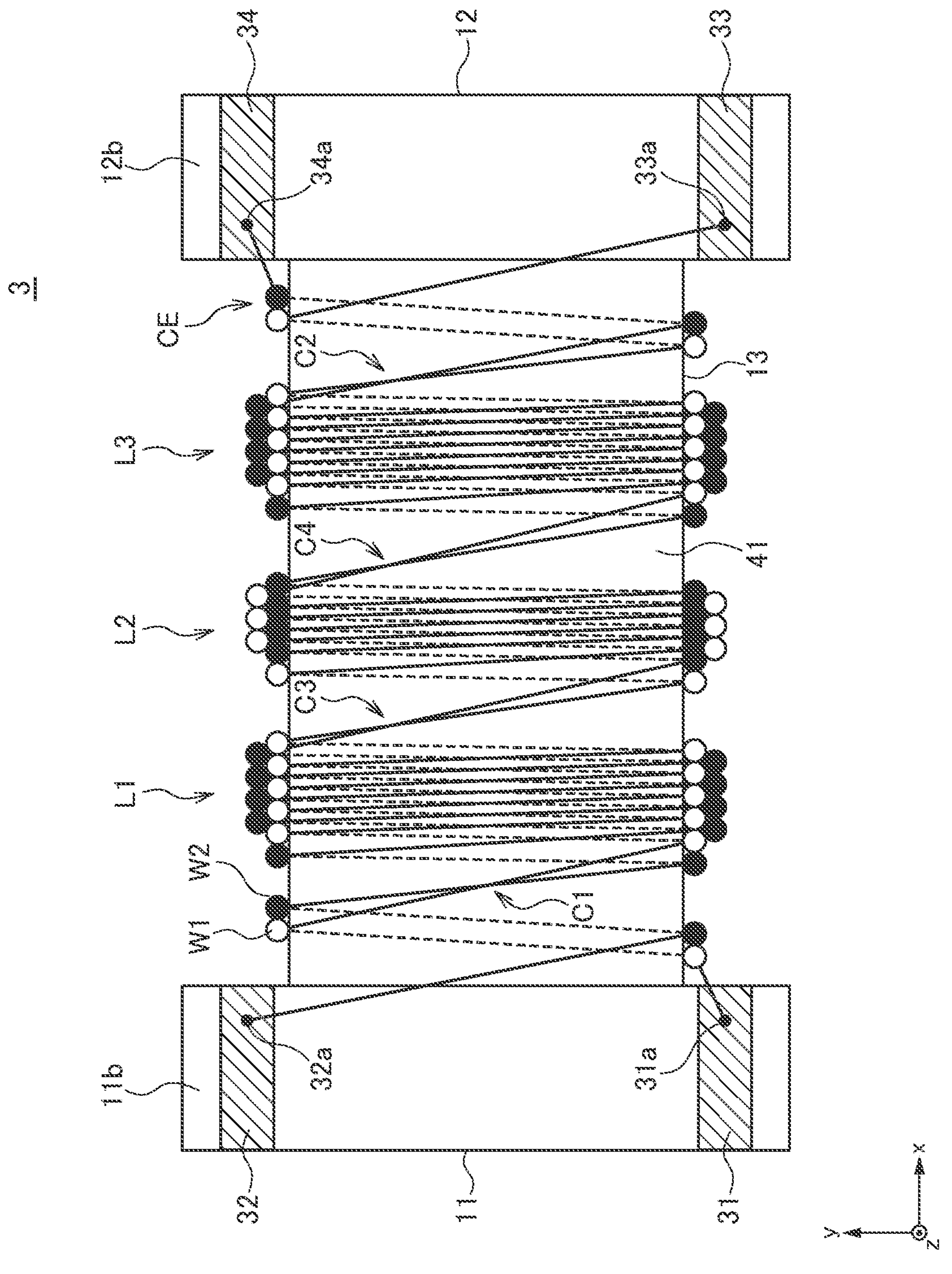
FIG. 9 is a schematic plan view for illustrating the winding layout of the first and second wires W1 and W2 in a common mode filter 3 according to a third embodiment of the present invention.

FIG. 9 is a schematic plan view for illustrating the winding layout of the first and second wires W1 and W2 in a common mode filter 3 according to a third embodiment.

As illustrated in FIG. 9, the common mode filter 3 according to the third embodiment differs from the common mode filter 2 according to the second embodiment in that the layer winding portion L is divided into first to third layer winding portions L1 to L3 and that a fourth crossing portion C4 is provided between the second and third layer winding portions L2 and L3. Other basic configurations are the same as those of the common mode filter 2 according to the second embodiment, so the same reference numerals are given to the same elements, and overlapping description will be omitted.

In the third layer winding portion L3, the first and second wires W1 and W2 are wound by layer winding in an aligned state with the first wire W1 positioned in the lower layer and the second wire W2 positioned in the upper layer. Although, in the example of FIG. 9, the number of turns in each of the first and third layer winding portions L1 and L3 is five, and the number of turns in the second layer winding portion L2 is four, the numbers of turns in the first to third layer winding portions L1 to L3 are not particularly limited. However, the number of turns in the first layer winding portion L1 and the number of turns in the third layer winding portion L3 are preferably made to coincide with each other. In the first layer winding portion L1, the second turn of the second wire W2 counted from the connection portion 32*a* is exceptionally positioned in the lower layer; in the second layer winding portion L2, the sixth turn of the first wire W1 counted from the connection portion 31*a* is exceptionally positioned in the lower layer; and in the third layer winding portion L3, the 11th turn of the second wire W2 counted from the connection portion 32*a* is exceptionally positioned in the lower layer.

As described above, the common mode filter 3 according to the third embodiment has the three layer winding portions L1 to L3, wherein the vertical positions of the first and second wires W1 and W2 are reversed between the layer winding portions L1 and L2, and the vertical positions of the first and second wires W1 and W2 are reversed between the layer winding portions L2 and L3, allowing the difference in length between the first and second wires W1 and W2 to be reduced. In addition, the first and second wires W1 and W2 cross each other between the first and second layer winding portions L1 and L2 and between the second and third layer winding portions L2 and L3, allowing the symmetry between the first and second wires W1 and W2 to be further enhanced.

Further, in the common mode filter 3 according to the third embodiment, the layer winding portion L is divided into three, whereby a parasitic capacitance component is reduced. This makes it possible to further improve signal characteristics in high frequency regions.

It is apparent that the present invention is not limited to the above embodiments, but may be modified and changed without departing from the scope and spirit of the invention.

What is claimed is:

1. A common mode filter comprising:

a core having a winding core part, a first flange part provided at one axial end of the winding core part, and a second flange part provided at other axial end of the winding core part;

first and second wires wound in a same direction around the winding core part;

first and second terminal electrodes provided on the first flange part and connected respectively with one ends of the first and second wires; and third and fourth terminal electrodes provided on the second flange part and connected respectively with other ends of the first and second wires, wherein the first and second wires have a first crossing portion at which first turns thereof counted from the one ends cross each other and a second crossing portion at which first turns thereof counted from the other ends cross each other, and wherein the first and second wires are wound by layer winding in an aligned state with one of the first and second wires positioned in a lower layer and other one thereof positioned in an upper layer in at least parts of the first and second wires between second turns thereof counted from the one ends and second turns thereof counted from the other ends.

2. The common mode filter as claimed in claim 1, wherein the first flange part has a first surface covered with connection portions of the first and second terminal electrodes at which the one ends of the first and second wires are respectively connected, wherein the second flange part has a second surface covered with connection portions of the third and fourth terminal electrodes at which the other ends of the first and second wires are respectively connected, wherein the winding core part has a winding surface parallel to the first and second surfaces, and wherein the first and second crossing portions are both positioned on the winding surface.

3. The common mode filter as claimed in claim 1, wherein the first and second wires further have:

a first layer winding portion in which the first and second wires are wound by layer winding in an aligned state with the one of the first and second wires positioned in the lower layer and the other one thereof positioned in the upper layer;

a second layer winding portion in which the first and second wires are wound by layer winding in an aligned state with the one of the first and second wires positioned in the upper layer and the other one thereof positioned in the lower layer; and a third crossing portion positioned between the first and second layer winding portions, at which the first and second wires cross each other.

4. The common mode filter as claimed in claim 3, wherein a difference in a number of turns between the first and second layer winding portions is one or less.

5. The common mode filter as claimed in claim 3, wherein the first and second wires further have:

a third layer winding portion in which the first and second wires are wound by layer winding in an aligned state with the one of the first and second wires positioned in the lower layer and the other one thereof positioned in the upper layer; and a fourth crossing portion positioned between the second and third layer winding portions, at which the first and second wires cross each other.

6. The common mode filter as claimed in claim 5, wherein a number of turns of the first layer winding portion and a number of turns of the third layer winding portion is a same.

7. A common mode filter comprising:

a core including a winding core part;

a first wire wound around the winding core part, the first wire having a first section including one end of the first wire, a second section including other end of the first wire, and a third section located between the first and second sections; and a second wire wound around the winding core part, the second wire having a fourth section including one end of the second wire, a fifth section including other end of the second wire, and a sixth section located between the fourth and sixth sections, wherein the first section of the first wire and the fourth section of the second wire cross each other, wherein the second section of the first wire and the fifth section of the second wire cross each other, wherein the sixth section of the second wire is wound on the third section of the first wire a plurality of times without crossing the third section of the first wire such that the third section of the first wire and the sixth section of the second wire form a first layer block, and wherein each of the first and second sections of the first wire and each of the fourth and fifth sections of the second wire is wound around the winding core part in less than one turn.

8. The common mode filter as claimed in claim 7, wherein the winding core part having a plurality of winding surfaces including a first winding surface, wherein the first section of the first wire and the fourth section of the second wire cross each other on the first winding surface, and wherein the second section of the first wire and the fifth section of the second wire cross each other on the first winding surface.

9. The common mode filter as claimed in claim 8, wherein the core further includes a first flange having a first flange surface on which the one ends of the first and second wires are fixed and a second flange having a second flange surface on which the other ends of the first and second wires are fixed.

10. The common mode filter as claimed in claim 9, wherein the first winding surface faces a same direction as the first and second flange surfaces.

11. The common mode filter as claimed in claim 9, wherein the first winding surface faces a different direction from the first and second flange surfaces.

12. The common mode filter as claimed in claim 7, wherein the first wire further has a seventh section located between the second and third sections, wherein the second wire further has an eighth section located between the fifth and sixth sections, wherein the seventh section of the first wire is wound on the eighth section of the second wire plurality of times without crossing the eighth section of the second wire such that the seventh section of the first wire and the eighth section of the second wire form a second layer block, and wherein the first and second wires cross each other between the first and second layer blocks.

13. The common mode filter as claimed in claim 12, wherein the second section of the first wire and the fifth section of the second wire cross each other twice.

14. The common mode filter as claimed in claim 12, wherein the first wire further has a ninth section located between the second and seventh sections, wherein the second wire further has a tenth section located between the fifth and eighth sections, wherein the tenth section of the second wire is wound on the ninth section of the first wire plurality of times without crossing the ninth section of the first wire such that the ninth section of the first wire and the tenth section of the second wire form a third layer block, and wherein the first and second wires cross each other between the second and third layer blocks.

15. The common mode filter as claimed in claim 14, wherein a number of turns of the third section of the first wire is a same as a number of turns of the ninth section of the first wire, and wherein a number of turns of the sixth section of the second wire is a same as a number of turns of the tenth section of the second wire.

16. The common mode filter as claimed in claim 15, wherein a number of turns of the seventh section of the first wire is different from the number of turns of the third section of the first wire, and wherein a number of turns of the eighth section of the second wire is different from the number of turns of the sixth section of the second wire.

17. The common mode filter as claimed in claim 16, wherein the number of turns of the seventh section of the first wire is smaller than the number of turns of the third section of the first wire, and wherein the number of turns of the eighth section of the second wire is smaller than the number of turns of the sixth section of the second wire.

* * * * *